(12) United States Patent
Bohner et al.

(10) Patent No.: US 6,298,940 B1
(45) Date of Patent: Oct. 9, 2001

(54) POWER STEERING SYSTEM FOR MOTOR VEHICLES

(75) Inventors: Hubert Bohner, Boeblingen; Martin Moser, Fellbach; Reinhold Schneckenburger, Rutesheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/337,422

(22) Filed: Jun. 22, 1999

(30) Foreign Application Priority Data

Jun. 27, 1998 (DE) .............................. 198 28 816

(51) Int. Cl.[7] ...................................... B62D 5/04
(52) U.S. Cl. ................... 180/403; 180/402; 180/422; 180/441; 180/446; 91/367
(58) Field of Search ...................... 180/403, 402, 180/405, 406, 407, 417, 421, 422, 429, 430, 441, 443, 446; 91/361, 366, 367; 701/41

(56) References Cited

U.S. PATENT DOCUMENTS

| 5,080,186 | * | 1/1992 | Elser et al. |
| 5,135,069 | * | 8/1992 | Hattori et al. |
| 5,253,729 | * | 10/1993 | Suzuki |
| 5,517,899 | * | 5/1996 | Bohner |
| 5,845,736 | | 12/1998 | Bohner et al. |
| 5,931,256 | * | 8/1999 | Langkamp ............... 180/422 |
| 6,112,844 | * | 9/2000 | Bohner et al. ........... 180/403 |

FOREIGN PATENT DOCUMENTS

| 39 18 987 | 12/1989 | (DE) . |
| 44 22 386 | 9/1995 | (DE) . |
| 195 41 752 | 5/1997 | (DE) . |
| 0472878 | 3/1992 | (EP) . |
| 2266499A | 11/1993 | (GB) . |

* cited by examiner

Primary Examiner—J. J. Swann
Assistant Examiner—F. Zeender
(74) Attorney, Agent, or Firm—Crowell & Moring, LLP

(57) ABSTRACT

A hydraulic power steering system for motor vehicles which is suitable for a steer-by-wire operation, having a steering handle which can be operated by a driver. A servo motor operates steered vehicle wheels. A servo valve operates the servo motor and is constructed as a rotary slide valve arrangement having mutually rotationally movable control parts which, together, are pushed by a spring system into a normal position relative to one another. An actuator is coupled with the control parts for their rotational adjustment relative to one another and operates the servo valve. A desired steering angle value generator is operated by way of the manual steering handle. An actual steering angle value generator is operated by way of the steered vehicle wheels. An automatic control circuit operates the actuator as a function of a comparison of the desired and actual steering angles. In order to improve this power steering system with respect to its control performance, an angle sensor is coupled with the control parts which detects their relative angular position. The automatic control circuit takes into account this relative angular position when operating the actuator.

13 Claims, 2 Drawing Sheets

POWER STEERING SYSTEM FOR MOTOR VEHICLES

BACKGROUND AND SUMMARY OF THE INVENTION

This application claims the priority of German patent 198 28 816.6-21, filed Jun. 27, 1998, the disclosure of which is expressly incorporated by reference herein.

The invention relates to a hydraulic power steering system for motor vehicles which is suitable for a steer-by-wire operation.

A power steering system of this type is known, for example, from German Patent Document DE 195 41 752 A1. The known power steering system has a steering handle which is constructed, for example, as a manual steering wheel and which is manually operated by a driver of the vehicle for steering the vehicle. In addition, the known power steering system has a hydraulic servo motor which, with respect to its drive, is coupled with steerable vehicle wheels and correspondingly operates these for steering the vehicle. In addition, the power steering system has a servo valve which operates the servo motor and is constructed as a rotary slide valve arrangement whose mutually rotatable control parts together are forced by means of a spring system preferably constructed as a torsion spring into a normal position relative to one another. Furthermore, the known power steering system has an actuator for operating the servo valve, in which case the actuator is directly or indirectly coupled with respect to the drive with the control parts of the rotary slide valve arrangement for their rotational adjustment with respect to one another. In addition, a desired steering angle value generator, which is operated by means of he steering handle, and an actual steering angle value generator, which is operated by means of the steerable vehicle wheels, as well as an automatic control and control arrangement are provided, in which case, for steering the vehicle, this automatic control and control arrangement operates the actuator as a function of a comparison of the desired and the actual steering angles.

In the case of servo valves constructed as rotary slide valve arrangements, manufacturing tolerances can lead to hydraulic asymmetries of the servo valve. Likewise, frictional losses, for example, in seals, may lead to hysteresis effects and thus to dead times in the servo valve, which impair a precise position control of the servo motor and thus an exact tracking stability of the vehicle.

The present invention relates to the problem of improving the automatic control performance in the case of a power steering system of the initially mentioned type.

According to the invention, this problem has been solved by providing a power steering system for a motor vehicle, comprising: a manual steering handle; a hydraulic servomotor which operates steerable vehicle wheels; a servo valve which operates the servo motor, said servo valve having two control parts which are rotatable relative to each other; a spring system which biases said control parts into a normal position relative to each other; an actuator which is directly or indirectly coupled with the control parts of the servo valve, said actuator being operable to adjust a relative angular position between the control parts; an angle sensor which is coupled directly or indirectly with the control parts of the servo valve, said angle sensor detecting the relative angular position between the control parts; a desired steering angle value sensor which senses a desired steering angle based on a position of the steering handle; an actual steering angle value sensor which senses an actual steering angle based on a position of the steerable vehicle wheels; and an automatic control arrangement which operates the actuator as a function of a comparison of the desired steering angle and the actual steering angle, and as a function of the relative angular position between the control parts.

According to the invention, this problem has been solved by providing a control system for a hydraulic power steering system for a motor vehicle having a manual steering handle, a hydraulic servomotor which operates steerable vehicle wheels, a servo valve which operates the servo motor, said servo valve having two control parts which are rotatable relative to each other, a spring system which biases said control parts into a normal position relative to each other; an actuator which is directly or indirectly coupled with the control parts of the servo valve, said actuator being operable to adjust a relative angular position between the control parts, said control system comprising: an angle sensor which is coupled directly or indirectly with the control parts of the servo valve, said angle sensor detecting the relative angular position between the control parts; a desired steering angle value sensor which senses a desired steering angle based on a position of the steering handle; an actual steering angle value sensor which senses an actual steering angle based on a position of the steerable vehicle wheels; and an automatic control arrangement which operates the actuator as a function of a comparison of the desired steering angle and the actual steering angle, and as a function of the relative angular position between the control parts.

According to the invention, this problem has been solved by providing a method of controlling a hydraulic power steering system for a motor vehicle having a manual steering handle, a hydraulic servomotor which operates steerable vehicle wheels, a servo valve which operates the servo motor, said servo valve having two control parts which are rotatable relative to each other, a spring system which biases said control parts into a normal position relative to each other; an actuator which is directly or indirectly coupled with the control parts of the servo valve, said actuator being operable to adjust a relative angular position between the control parts, said method comprising: detecting the relative angular position between the control parts; sensing a desired steering angle based on a position of the steering handle; sensing an actual steering angle based on a position of the steerable vehicle wheels; and operating the actuator as a function of a comparison of the desired steering angle and the actual steering angle, and as a function of the relative angular position between the control parts.

In this case, the invention is based on the general idea of detecting via an angle sensor the control path of the servo valve and using it as an additional control value for improving the automatic control. For example, the actuating power which can be generated by the servo motor depends on the control path of the servo valve which, as a rule, is constructed as a proportional control valve so that, as the result of the detection of the control path, the actuating power on the servo motor can be better apportioned. A desired steering angle change can then also be implemented with lower control expenditures and particularly more rapidly if the automatic control and control arrangement of the power steering system always adjusts the suitable control path at the servo valve.

Furthermore, in the case of servo valves which are equipped with a so-called "open center", special advantages exist when lateral forces are controlled Which act upon the vehicle wheels from the outside. In the case of a servo valve with an open center, all connections of the servo valve communicate with one another when the servo valve assumes its normal position. A servo valve with an open center has the important advantage that a pressure source of the hydraulic system—which preferably is a hydraulic medium pump, can continuously supply hydraulic pressure. In the normal position of the servo valve, the not required hydraulic pressure is relaxed by way of its open center into a corresponding reservoir. If the servo motor is to be operated, the required hydraulic pressure is immediately available.

However, in the normal position of the servo valve, lateral wheel forces may by way of the open center of the servo valve cause an adjustment of the servo motor and thus a steering angle change. In order to counteract this, a suitable countercontrol force must be generated by a corresponding operation of the servo valve on the servo motor. Since, in the case of the power steering system according to the invention, a targeted, apportioned servo valve adjustment can be carried out in a particularly simple manner, the power steering system according to the invention can appropriately react to lateral wheel forces, without any large automatic control expenditures. The reason is that, as soon as an interfering force acts upon the steerable vehicle wheels, as a function of the interfering force, an apportioned counterforce can be applied by way of a correspondingly targeted servo valve control.

In addition to the reduced automatic control requirements as a whole, the overall steering system is stabilized, in which case particularly natural oscillations cannot build up in the control circuit.

Corresponding to an advantageous embodiment of the power steering system according to the invention, pressure gauges may be provided which are used for determining a differential pressure between two hydraulic connections of the hydraulic servo motor, the hydraulic connections being acted upon by hydraulic pressure by the servo valve for operating the servo motor. By means of the differential pressure existing between the hydraulic connections of the servo motor, a quantity can be determined in a simple manner which correlates with the actuating power of the servo motor. As a result, it is also possible to adjust the actuating power required for the adjustment of a desired steering angle or to determine an interfering force acting upon the steered vehicle wheels.

Furthermore, corresponding to a further development of the power steering system according to the invention, an assignment can be carried out between the differential pressures at the hydraulic connections of the servo motor and the relative angular positions of the control parts of the rotary slide valve arrangement with respect to the another. Likewise, an assignment can be carried out between the relative angular positions of the control parts of the rotary slide valve arrangement and the valve flow rate and thus of the adjusting speed of the servo motor and of the steered wheels. In addition, devices for determining the actual viscosity of the hydraulic medium can also be provided by use of which the valve flow rate can be determined more precisely. The determination of the hydraulic medium viscosity can be carried out, for example, by measuring the temperature. By means of such assignments, which each form a characteristic curve of the servo valve, it is possible to balance or adjust tolerance-caused deviations of the hydraulic symmetry of the servo valve electronically by a corresponding calibration of the assignment. The power steering system thereby becomes independent of manufacturing tolerances and can therefore ensure a precise control of the servo motor in both steering directions and thus an exact tracking stability of the vehicle.

In particular, it is possible to further develop the automatic control arrangement and control arrangement such that the above-mentioned assignment between the relative angular position of the control parts of the rotary slide valve arrangement and the differential pressure between the hydraulic connections of the servo motor is constantly updated. As a result, on the one hand, wear phenomena of the hydraulic system can be compensated constantly; and, on the other hand, particularly a diagnosis of the hydraulic system can be carried out with respect to its operability, for example, in that a comparison with defined threshold values is constantly carried out.

It is understood that the above-mentioned characteristics and the characteristics which will be explained in the following can not only be used in the respective indicated combination but also in other combinations or alone without leaving the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
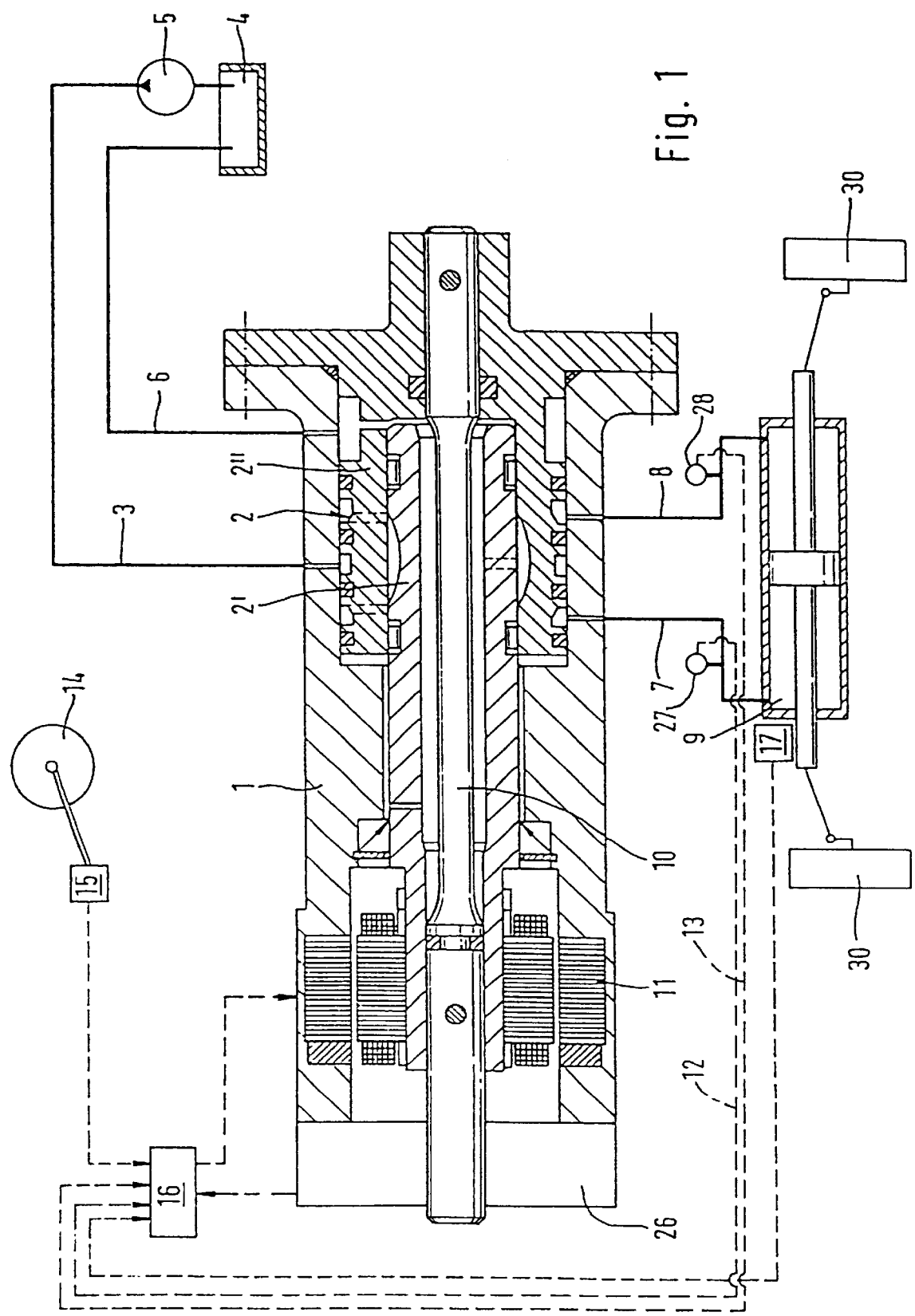
FIG. 1 is a schematic partially sectional view according to a preferred embodiment in which an electric actuator is provided.

According to FIG. 1, a largely conventional servo valve 2, which is constructed in the manner of a rotary slide valve arrangement, is arranged in a housing 1 and consists essentially of a rotary slide valve part 2' and of a rotary slide valve bush 2" which is coaxial thereto and is fixedly arranged on the housing. This servo valve 2 has a pressure connection 3 which is connected with the delivery side of a servo pump 5 connected on the suction side with a hydraulic reservoir 4. Furthermore, the servo valve 2 has a low-pressure connection 6, which communicates with the reservoir 4, as well as two motor connections 7 and 8 which are connected with one side respectively of a double-acting piston—cylinder unit provided as the servo motor 9.

The servo valve 2 has a so-called open center; that is, all connections 3 and 6 to 8 communicate with one another when the control parts of the servo valve 2, that is, the rotary slide valve part 2' and the rotary slide valve bush 2", take up a normal or center position relative to one another. If the rotary slide valve part 2" and the rotary slide valve bush 2" are rotated relative to one another in one or the other direction with respect to the center position, when the servo pump 5 is operating, a more or less large controllable pressure difference is generated between the motor connections 7 with the result that the servo motor 9, in turn, generates a corresponding large control force in one or the other direction.

The rotary slide valve part 2' and the rotary slide valve bush 2" are connected with one another by means of a spring element; here, by means of a torsion spring 10 arranged in an axial bore of these parts. In this case, the spring element or the torsion spring 10 seeks to hold the two parts 2' and 2" in their center position relative to one another.

On the end of the rotary slide part 2', which is on the left in FIG. 1, the rotor of an electric motor 11 arranged in a housing 1 is arranged, which electric motor 11, when energized, is capable of rotating the rotary slide valve part 2' against the force of the torsion spring 10 in one or the other direction relative to the rotary slide valve bush 2".

On the end of the housing 1, which is on the left corresponding to FIG. 1, an angle sensor 26 is also mounted which, on the one hand, is non-rotatably coupled with the housing 1 and is therefore indirectly also non-rotatably coupled with the rotary slide valve bush 2" because the latter, in turn, is non-rotatably fastened on the housing 1. On the other hand, the angle sensor 26 is non-rotatably coupled with the torsion spring 10 and this indirectly also non-rotatably with the rotary slide valve part 2' because this rotary slide valve part 2' is non-rotatably fastened on the torsion spring 10. In this manner, the angle sensor 26 can detect the relative position between the rotary slide valve part 2' and the rotary slide valve bush 2" and can supply it or a signal value correlating therewith by way of a corresponding signal line to an automatic control arrangement and control arrangement or automatic control circuit 16. This automatic control circuit 16 contains or comprises a controller for the servo valve 2, which controller adjusts the given differential angles between the control parts 2' and 2" with a very high precision; a controller for the steering system which adjusts the piston travel or the wheel angle corresponding to the respective desired value; and a controller for the vehicle which can compute, for example, the pressure difference between the connections 7 and 8 of the servo motor 9, so that respective pressure gauging sensors can be checked or are superfluous. The controllers are preferably constructed as electronic controllers, particularly in the form of a computer.

In addition, one pressure gauging sensor 27 and 28 respectively is assigned to the hydraulic connections of the servo motor 9 and communicate with one of the hydraulic connections 7 and 8 respectively and measure the pressure existing therein or existing in the corresponding chambers of the servo motor 9. The measuring results or signal values which correlate with the pressures existing in the motor connections 7 and 8 are supplied by way of corresponding signal lines 12 and 13 to the automatic control circuit 16.

The arrangement of FIG. 1 operates as follows: By means of a manual steering wheel 14 operated by the driver of the respective vehicle, a desired value generator or sensor 15 is operated whose signals each define a desired value for the steering angle, which is to be adjusted, of the steered vehicle wheels 30 operated by the servomotor 9 and are supplied to an input of the automatic control circuit 16. The automatic control circuit 16 compares the desired value with the respective actual value which is detected by means of an actual value generator or sensor 17 which interacts with a steering gear part or—as illustrated—with the piston rod of the servo motor 9, which is forcibly coupled with the steered vehicle wheels 30. Corresponding to the result of the desired-actual value comparison, the automatic control circuit 16 controls the electric motor 11 so that this electric motor 11 rotates in one or the other direction and adjusts the servo valve 2 more or less far in one or the other direction. Thus, a correspondingly high pressure difference is generated between the motor connections 7 and 8 in one or the other direction, and the servo motor 9 is driven by means of a more or less high power in one or the other direction so that the steered wheels are adjusted.

The extent of the rotation of the electric motor 11 and thus the adjusting travel of the servo valve 2, whose control parts 2' and 2" are rotationally adjusted relative to one another by the electric motor 11, is detected by the angle sensor 26 and is reported to the automatic control circuit 16. In this case, it may be provided that, at the start of the adjusting operation, the automatic control circuit 16 determines the adjusting travel for the servo valve 2 which is suitable for the desired steering angle adjustment or the steering angle change and adjusts this control travel, controlled by way of the angle sensor 26, by means of the electric motor 11 on the servo valve 2. By defining the adjusting travel on the servo valve 2 which is suitable for the respective steering angle change, the automatic control expenditures can be reduced within the scope of the desired-actual value comparison so that the control goal, that is, the desired actual steering angle value can be achieved rapidly and with few valve adjustments.

With respect to the principle of the automatic control, it is not important whether by way of the servo valve 2 a certain differential pressure is to be adjusted at the motor connections 7 and 8 which results from an angular position between the control parts 2' and 2" of the servo valve 2, or whether a certain angular position is to be adjusted on the servo valve 2 between its control parts 2' and 2", which then results in a corresponding pressure difference between the motor connections 7 and 8. In other words, it is unimportant for the automatic control whether the angular position (to which a differential pressure is assigned) or whether the differential pressure (to which an angular position is assigned) forms the command variable of the automatic control. At any rate, it is possible by means of the arrangement according to the invention to assign to the relative angular positions between the rotary slide valve part 2' and the rotary slide valve bush 2" one defined pressure difference respectively between the motor connections, and vice-versa.

In this case, it may be provided that, in the course of the operation of the servo valve 2, the automatic control circuit 16 assigns a respective pressure difference between the motor connections 7 and 8 to all relative positions between the control parts 2' and 2" and thus measures a type of characteristic curve of the servo valve 2 and files it in a corresponding memory. In order to then adjust a certain pressure difference, that is, a certain adjusting force on the servo motor 9, the pertaining relative angle between the control parts 2' and 2" of the servo valve 2 can be determined from the stored characteristic curves, particularly also by interpolation or the like. As a result, the desired pressure difference can be adjusted rapidly and with few control expenditures by a targeted triggering of the electric motor 11.

A particularly important advantage of the arrangement according to the invention is the fact that, by sensing the characteristic curve of the servo valve 2, in which case the relative angular position between the control parts 2' and 2" of the servo valve 2 can also be sensed as a function of another parameter of the power steering system, an asymmetrical performance of the servo valve 2 caused by manufacturing tolerances can be eliminated by a corresponding calibration of the measured characteristic curve.

Another important advantage of the steering system according to the invention is the fact that additional parameters, specifically, for example, the angular position and the differential pressure, are available to the steering system. These parameters permit an additional monitoring of the steering system with respect to its functional and operational reliability.

Figure 2:
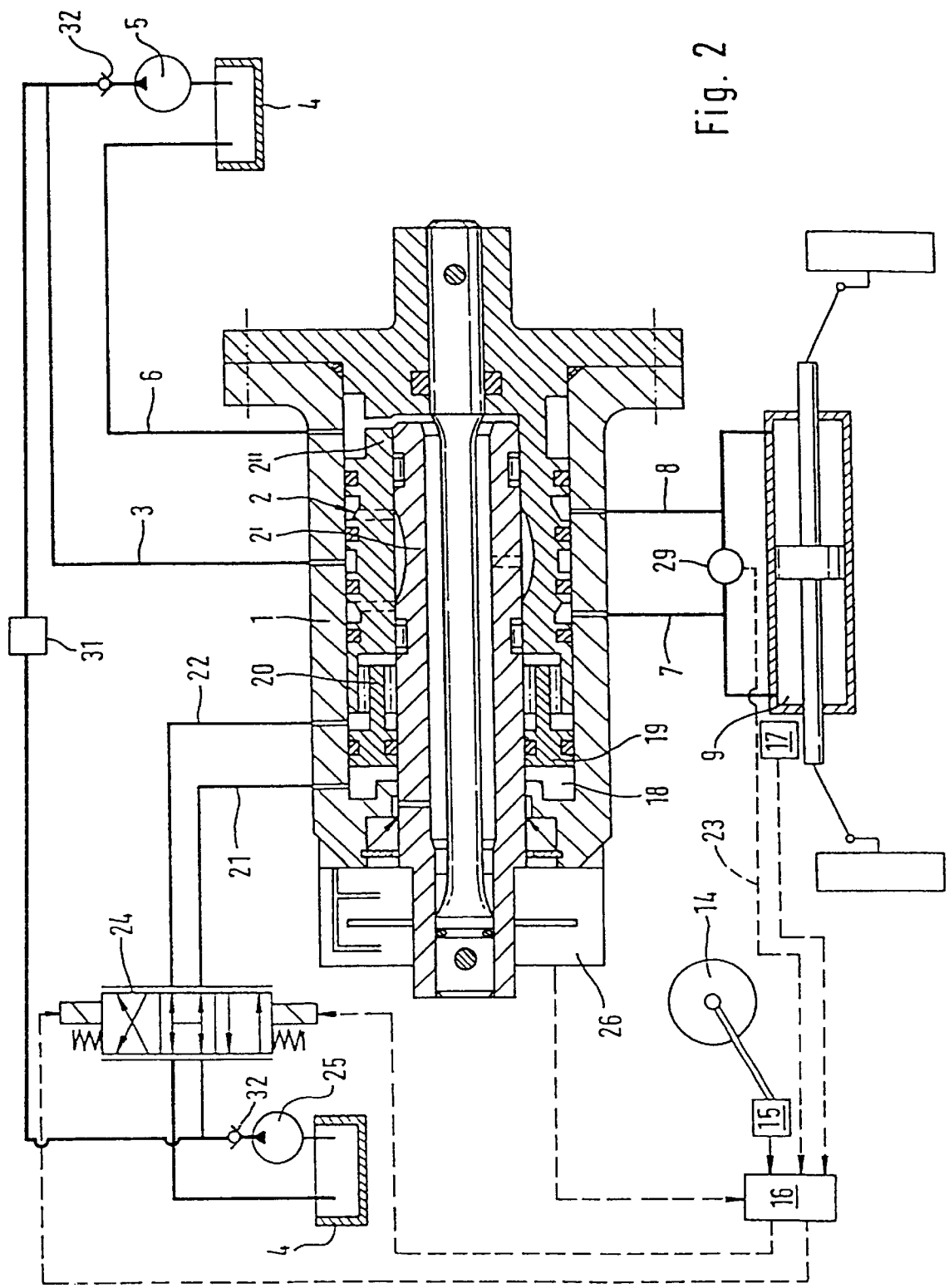
FIG. 2 is a schematic partially sectional view according to another preferred embodiment in which the control parts of the servo valve can be adjusted relative to one another by a hydraulic actuator.

The embodiment according to FIG. 2 differs from the embodiment illustrated in FIG. 1, among other things, by the fact that the electric motor 11 is absent and an annulus 18 is arranged within the housing 1, the interior circumferential wall of this annulus 18 being formed by a cylindrical axial section of the rotary slide valve part 2' and its exterior circumferential wall being formed by the interior wall of the housing 1. The annulus 18 is divided into two ring chambers by means of an axially displaceable ring piston 19. The ring piston 19 has a cylindrical continuation 20 which, on the exterior side as well as on the interior side, is provided with diagonally mutually aligned grooves or webs. These grooves or webs engage in diametrically opposed grooves and webs which, on the one hand, are arranged on an axial section of the outer circumference of the rotary slide valve part 2' and, on the other hand, are arranged on an inner circumference section of the rotary slide valve bush 2" or of the housing 1 stationary with respect to the rotary slide valve bush 2". Since the webs or grooves extend on the exterior side of the continuation 20 diagonally to the grooves or webs on the interior side of the continuation 20, the continuation 20 as well as the ring piston 19 forcibly carry out an axial stroke as soon as the rotary slide valve part 2' and the rotary slide valve bush 2" are rotated relative to one another. Correspondingly, the control parts 2' and 2" are forcibly rotated relative to one another in one or the other direction when the ring piston 19 is axially displaced in one or the other direction.

The ring chambers, which are separated from one another by the ring piston 19 in the ring space 18, can be connected by way of lines 21 and 22 as well as a control valve 24 with a pump 25 as well as the hydraulic reservoir 4 so that when the control valve 24 is operated correspondingly, between the two ring chambers in the ring space 18, a more or less large pressure difference can be established in one or the other direction. As a result, the ring piston 19 can then be displaced in one or the other axial direction so that the servo valve 2 is adjusted and a pressure difference is established between the motor connections 7 and 8 of the servomotor 9. In this manner, the servomotor 9 can then carry out an adjusting stroke by which the vehicle steering system is adjusted.

Also in the embodiment corresponding to FIG. 2, an angle sensor 26 is again arranged on the left side of the housing 1. In this case, the angle sensor is, on the one hand, again non-rotatably coupled indirectly by way of the housing 1 with the rotary slide valve bush 2" of the servo valve 2. On the other hand, the angle sensor 26 is non-rotatably coupled in this embodiment directly with the rotary slide valve part 2' of the servo valve 2.

In addition, a differential pressure sensor 29 is arranged between the hydraulic connections 7 and 8 of the servo motor 9, which differential pressure sensor 29 communicates with the two motor connections 7 and 8 in order to measure the differential pressure existing between these connections 7 and 8 and to supply this differential pressure or a signal value correlated therewith by way of a corresponding signal line 23 to the automatic control circuit 16.

Furthermore, the delivery sides of the pumps 5 and 25 are connected with one another by way of corresponding hydraulic lines and a switchable shut-off valve 31. Additional return valves 32 may also be arranged in front of the pumps 5 and 25.

The arrangement of FIG. 2 operates as follows: By means of the desired value generator 15 operated by means of the manual steering wheel 14, a desired value is again defined for the steering angle of the steered vehicle wheel 30 to be adjusted. The automatic control circuit 16 again compares this desired value with the actual value reported by the actual value generator 17 and, in the event of the occurrence of a desired-actual value deviation, operates the valve 24. According to the direction of the desired-actual value deviation, the control valve 24 is then displaced in one or the other direction with the result that the ring piston 19 is displaced in one or the other direction, whereby a more or less large pressure difference in one or the other direction is then adjusted at the motor connections 7 and 8 of the servomotor 9, and the servomotor 9 carries out an adjusting stroke for compensating the desired-actual value deviation; that is, the steered vehicle wheels 30 are adjusted corresponding to the respective desired value. Here also, the operation of the hydraulic motor 18, 19 and thus the adjusting travel of the servo valve 2 can be checked by means of the angle sensor 26 so that, by way of an apportioned operation of the hydraulic actuator 18, 19, a predetermined adjusting path or adjusting angle can be set at the servo valve 2, which results in a more precise steering angle adjustment.

It is also possible and advantageous to arrange the electric motor 11 as well as the hydraulic motor 18, 19 in a combined manner in order to be able to control the servo valve 2 by means of two mutually independent units. In this case, the electric motor 11 may optionally be adjusted analogous to the desired values of the desired value generator 15, while the hydraulic motor 18, 19 is operated by an autonomous control which detects other parameters, such as cross wind influences, by means of separate sensors and controls them by means of steering interventions.

The electric motor 11 may also be constructed as a socalled rotary magnet.

In the event that, as in the illustrated embodiment, two separate pumps 5 and 25 are provided for supplying the servo motor 9, on the one hand, and the hydraulic motor 18, 19, on the other hand, with hydraulic pressure, it is possible by means of the shut-off valve 31 and the connection of the delivery sides of both pumps 5 and 25 to operate in an emergency operation, if one of the two pumps 5 or 25 has failed, the hydraulic motor 18, 19 as well as the servomotor by means of only one of the two pumps 5 or 25. This creates a redundant system which has an increased fail-safe characteristic.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power steering system for a motor vehicle, comprising:

a manual steering handle;

a hydraulic servomotor which operates steerable vehicle wheels;

a servo valve which operates the servomotor, said servo valve having two control parts which are rotatable relative to each other;

a spring system which biases said control parts into a normal position relative to each other;

an actuator which is directly or indirectly coupled with the control parts of the servo valve, said actuator being operable to adjust a relative angular position between the control parts;

an angle sensor which is coupled directly or indirectly with the control parts of the servo valve, said angle sensor detecting the relative angular position between the control parts;

a desired steering angle value sensor which senses a desired steering angle based on a position of the steering handle;

an actual steering angle value sensor which senses an actual steering angle based on a position of the steerable vehicle wheels; and an automatic control arrangement which operates the actuator as a function of a comparison of the desired steering angle and the actual steering angle, and as a function of the relative angular position between the control parts so as to rapidly implement a desired steering angle change and counteract adjustment of the servomotor by lateral wheel forces.

2. A power steering system according to claim 1, wherein said system is a steer-by-wire system.

3. A power steering system according to claim 1, wherein said spring system comprises a torsion spring.

4. A power steering system according to claim 1, wherein said servo valve is a rotary slide valve arrangement.

5. A power steering system according to claim 1, wherein at least one pressure gauging device is provided which is used for determining a differential pressure between two hydraulic connections of the hydraulic servomotor, the hydraulic connections being acted upon by hydraulic pressure via the servo valve to operate the servomotor.

6. A power steering system according to claim 5, wherein the automatic control arrangement assigns at least one of (a) the differential pressure between the hydraulic connections of the servomotor and (b) an adjusting speed of the servomotor or of the steerable vehicle wheels to the relative angular position of the control parts, said automatic control arrangement operating the actuator as a function of said differential pressure or said adjusting speed.

7. A power steering system according to claim 6, wherein the automatic control arrangement constantly updates said assignment.

8. A power steering system according to claim 6, wherein the automatic control arrangement uses said assignment for a diagnosis of the power steering system.

9. A power steering system according to claim 5, wherein said at least one pressure gauging device is a differential pressure sensor which communicates with both hydraulic connections.

10. A power steering system according to claim 5, wherein said at least one pressure gauging device comprises two pressure gauging sensors which each communicate with one of the hydraulic connections.

11. A control system for a hydraulic power steering system for a motor vehicle having a manual steering handle, a hydraulic servomotor which operates steerable vehicle wheels, a servo valve which operates the servomotor, said servo valve having two control parts which are rotatable relative to each other, a spring system which biases said control parts into a normal position relative to each other, and an actuator which is directly or indirectly coupled with the control parts of the servo valve, said actuator being operable to adjust a relative angular position between the control parts, said control system comprising:

an angle sensor which is coupled directly or indirectly with the control parts of the servo valve, said angle sensor detecting the relative angular position between the control parts;

a desired steering angle value sensor which senses a desired steering angle based on a position of the steering handle;

an actual steering angle value sensor which senses an actual steering angle based on a position of the steerable vehicle wheels; and an automatic control arrangement which operates the actuator as a function of a comparison of the desired steering angle and the actual steering angle, and as a function of the relative angular position between the control parts so as to rapidly implement a desired steering angle change and counteract adjustment of the servomotor by lateral wheel forces.

12. A control system according to claim 11, wherein at least one pressure gauging device is provided which is used for determining a differential pressure between two hydraulic connections of the hydraulic servomotor, the hydraulic connections being acted upon by hydraulic pressure via the servo valve to operate the servomotor.

13. A control system according to claim 12, wherein the automatic control arrangement assigns at least one of (a) the differential pressure between the hydraulic connections of the servomotor and (b) an adjusting speed of the servomotor or of the steerable vehicle wheels to the relative angular position of the control parts, said automatic control arrangement operating the actuator as a function of said differential pressure or said adjusting speed.

* * * * *